United States Patent
Kaprinidis et al.

(10) Patent No.: US 7,214,729 B2
(45) Date of Patent: May 8, 2007

(54) FLAME RETARDANT POLYMERIC ELECTRICAL PARTS

(75) Inventors: Nikolas Kaprinidis, New York, NY (US); Nicola Lelli, New York, NY (US)

(73) Assignee: Ciba Specialty Chemicals Corp., Tarrytown, NY (US)

(*) Notice: Subject to any disclaimer, the term of this patent is extended or adjusted under 35 U.S.C. 154(b) by 144 days.

(21) Appl. No.: 10/675,154

(22) Filed: Sep. 30, 2003

(65) Prior Publication Data

US 2004/0087689 A1 May 6, 2004

Related U.S. Application Data

(60) Provisional application No. 60/439,736, filed on Jan. 13, 2003, provisional application No. 60/419,263, filed on Oct. 17, 2002.

(51) Int. Cl.
  *C08K 5/3492* (2006.01)
  *C08K 5/34* (2006.01)
  *C08K 5/52* (2006.01)

(52) U.S. Cl. .................. 524/100; 524/99; 524/102; 524/103; 524/104; 524/142; 524/144

(58) Field of Classification Search .......... 524/99, 524/100, 102, 103, 104, 142, 144
See application file for complete search history.

(56) References Cited

U.S. PATENT DOCUMENTS

| | | | | |
|---|---|---|---|---|
| 5,004,770 A * | 4/1991 | Cortolano et al. | ........... | 524/93 |
| 5,096,950 A | 3/1992 | Galbo et al. | ........... | 524/99 |
| 5,112,890 A * | 5/1992 | Behrens et al. | ........... | 524/95 |
| 5,124,378 A * | 6/1992 | Behrens et al. | ........... | 524/95 |
| 5,204,473 A * | 4/1993 | Winter et al. | ........... | 546/188 |
| 5,216,156 A * | 6/1993 | Galbo et al. | ........... | 544/198 |
| 5,300,544 A * | 4/1994 | Galbo et al. | ........... | 524/100 |
| 5,391,812 A * | 2/1995 | Rowland et al. | ........... | 560/145 |
| 5,393,812 A | 2/1995 | Haley et al. | ........... | 524/91 |
| 5,844,026 A * | 12/1998 | Galbo et al. | ........... | 524/100 |
| 5,948,836 A | 9/1999 | Bonora | ........... | 524/99 |
| 6,117,995 A * | 9/2000 | Zedda et al. | ........... | 544/207 |
| 6,225,387 B1 | 5/2001 | Hallenbeck et al. | ........... | 524/178 |
| 6,271,377 B1 * | 8/2001 | Galbo et al. | ........... | 546/14 |
| 6,309,987 B1 | 10/2001 | Srinivasan | ........... | 442/147 |
| 6,472,456 B1 | 10/2002 | Horsey et al. | ........... | 524/99 |
| 6,599,963 B2 | 7/2003 | Horsey et al. | ........... | 524/100 |
| 6,800,678 B2 | 10/2004 | Horsey et al. | ........... | 524/100 |
| 6,881,773 B2 | 4/2005 | Zingg et al. | | |
| 2002/0120041 A1 | 8/2002 | Zingg et al. | ........... | 524/100 |
| 2004/0087689 A1 | 5/2004 | Kaprinidis et al. | | |
| 2004/0097620 A1 | 5/2004 | Kaprinidis et al. | | |
| 2005/0004294 A1 | 1/2005 | Chin et al. | | |

FOREIGN PATENT DOCUMENTS

| | | |
|---|---|---|
| EP | 0792911 | 9/1997 |
| WO | 99/00450 | 1/1999 |

OTHER PUBLICATIONS

N. Kaprinidis and R. King, Abstract posted on the Society of Plastics Engineers website, Sep. 2001, for paper submitted to the Polymer Modifiers and Additives Div., presented at Polyolefins 2002 Conf., Feb. 2002.

R. Srinivasan, et al., "A Revolutionary UV Stable Flame Retardant System for Polyolefins", Int. Conf. Addit. Polyolefins, (1998), pp. 69-83, Feb. 1998.

R. Srinivasan, et al., "Advances in a Revolutionary Flame Retardant System for Polyolefins", Polyolefins 2000, INt. Conf. Polyolefins 2000, pp. 571-581, Feb. 2000.

* cited by examiner

*Primary Examiner*—Kriellion Sanders
(74) *Attorney, Agent, or Firm*—Tyler A. Stevenson

(57) ABSTRACT

Disclosed is a flame retardant lighting assembly comprising thermoplastic insulation, plugs and sockets. The thermoplastic resin is for example polypropylene homopolymer and comprises a synergistic combination of an N-alkoxyoxy hindered amine and a conventional organohalogen flame retardant. The addition of low levels of acid scavengers such as hydrotalcites is advantageous.

14 Claims, No Drawings

FLAME RETARDANT POLYMERIC ELECTRICAL PARTS

This application claims the benefit under 35 USC 119(e) of U.S. Provisional Application Nos. 60/419,263, filed Oct. 17, 2002 and 60/439,736, filed Jan. 13, 2003.

The present invention relates to flame retardant polymeric electrical/electronic parts, in particular to flame retardant polyolefin based wiring insulation, plugs and sockets for lighting applications.

BACKGROUND

U.S. Pat. No. 5,096,950 discloses the co-use of certain NOR (N-alkoxy) hindered amines with a brominated $Sb_2O_3$-containing flame retardant in polypropylene.

U.S. Pat. No. 5,393,812 discloses polyolefin compositions which are made flame retardant by a combination of a halogenated hydrocarbyl phosphate or phosphonate ester flame retardant in combination with a alkoxyamine functional hindered amine.

U.S. Pat. No. 5,844,026 discloses polyolefin compositions comprising certain NOR hindered amines and certain conventional flame retardants.

U.S. Pat. No. 6,117,995 discloses that certain N-alkoxy hindered amines may be used as flame retardants for organic polymers.

U.S. Pat. No. 6,271,377 discloses polyolefin compositions that comprise N-hydroxyalkoxy hindered amines and a halogenated flame retardant.

U.S. Pat. No. 6,309,987 and equivalent WO 99/54530 teach polyolefin non-woven flame retardant fabrics that comprise N-alkoxyamines.

A Revolutionary UV Stable Flame Retardant System for Polyolefins—R. Srinivasan, A. Gupta and D. Horsey, *Int. Conf. Addit. Polyolefins* 1998, 69–83, teaches polyolefins comprising certain NOR hindered amines with halogen and phosphorus containing conventional flame retardants.

Advances in a Revolutionary Flame Retardant System for Polyolefins—R. Srinivasan, B. Rotzinger, *Polyolefins 2000, Int. Conf Polyolefins* 2000, 571–581, teaches polyolefins comprising certain NOR hindered amines with brominated and phosphorus containing flame retardants.

N. Kaprinidis and R. King, in an abstract posted on the Society of Plastics Engineers website, posted September 2001, discuss the use of NOR hindered amines as flame retardants in polyolefins. The abstract is for a paper submitted to the Polymer Modifiers and Additives Division subsection to be presented at the Polyolefins 2002 conference in Houston, Tex., Feb. 24, 2002. The website is www.PMAD.org.

EP 0792911 A2, discloses polyolefin compositions that comprise alkoxyamine functional hindered amines and tris (trihalogenopentyl)phosphate flame retardants.

WO 99/00450, copending U.S. application Ser. No. 09/502,239, filed Nov. 3, 1999, and Ser. No. 09/714,717, filed Nov. 16, 2000, disclose the use of certain N-alkoxy hindered amines as flame retardants.

U.S. Pat. No. 6,225,387 discloses organohalide flame retardant polymer compositions.

It has been discovered that certain combinations of sterically hindered alkoxyamine stabilizers and organohalogen flame retardants are especially effective towards providing flame retardancy to plastic electrical parts for lighting applications.

DETAILED DISCLOSURE

In particular, the present application relates to flame retardant polymeric electrical part compositions which comprise (a) a thermoplastic resin and (b) an effective flame retarding amount of a synergistic mixture of (i) at least one sterically hindered alkoxyamine stabilizer and (ii) at least one conventional organohalogen flame retardant.

Sterically Hindered Alkoxyamine Stabilizers of Component (I)

The present hindered amines are for example monomeric compounds or are oligomeric or polymeric compounds.

The present sterically hindered stabilizers of components (i) are known in the art, and are for example of the formula

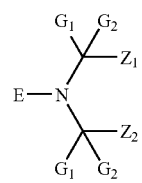

where $G_1$ and $G_2$ are independently alkyl of 1 to 8 carbon atoms or are together pentamethylene, $Z_1$ and $Z_2$ are each methyl, or $Z_1$ and $Z_2$ together form a linking moiety which may additionally be substituted by an ester, ether, amide, amino, carboxy or urethane group, and E is alkoxy, cycloalkoxy, aralkoxy, aryloxy or —O—T—$(OH)_b$, T is a straight or branched chain alkylene of 1 to 18 carbon atoms, cycloalkylene of 5 to 18 carbon atoms, cycloalkenylene of 5 to 18 carbon atoms, a straight or branched chain alkylene of 1 to 4 carbon atoms substituted by phenyl or by phenyl substituted by one or two alkyl groups of 1 to 4 carbon atoms;

b is 1, 2 or 3 with the proviso that b cannot exceed the number of carbon atoms in T, and when b is 2 or 3, each hydroxyl group is attached to a different carbon atoms of T.

E is for example alkoxy, cycloalkoxy or aralkoxy. For instance, E is methoxy, propoxy, cyclohexyloxy or octyloxy.

The present sterically hindered stabilizers of component (i) are for example of the formula A–R

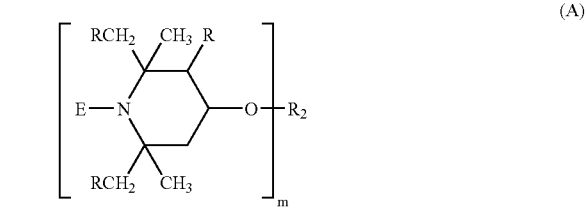

(A)

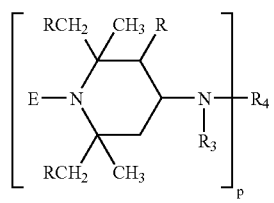
(B)
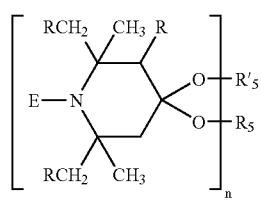
(C)
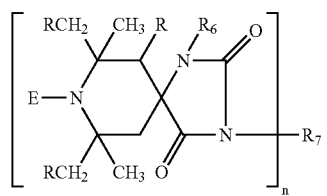
(D)
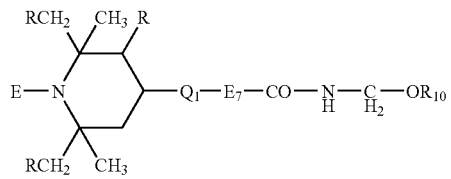
(E)
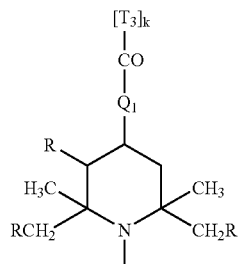
(F)
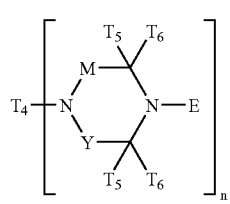
(G)
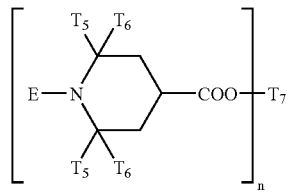
(H)
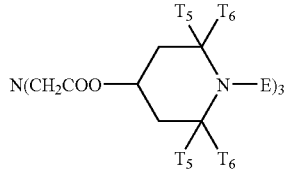
(I)
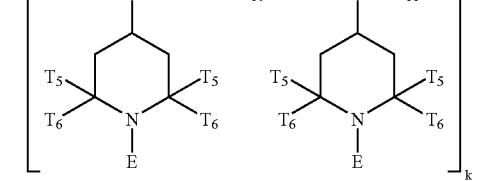
(J)
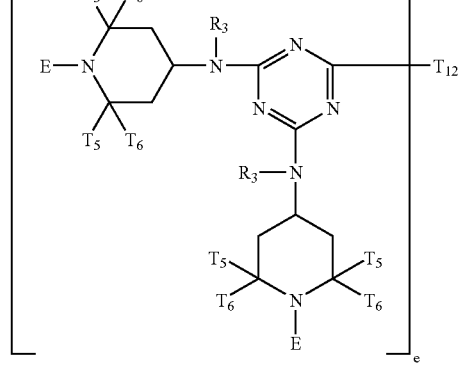
(K)
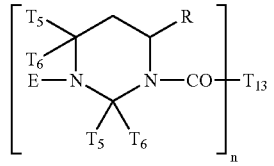
(L)
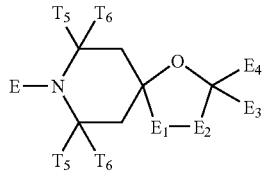
(M)
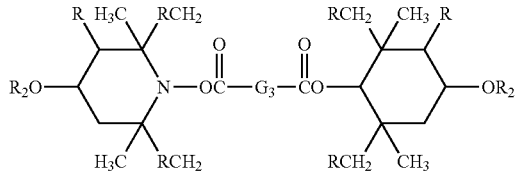
(N)
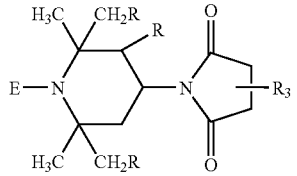
(O)

-continued

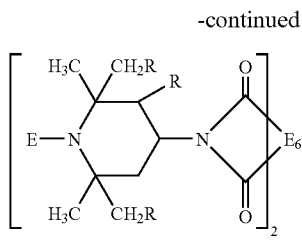

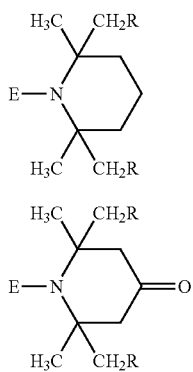

wherein

E is alkoxy of 1 to 18 carbon atoms, cycloalkoxy of 5 to 12 carbon atoms or aralkoxy of 7 to 15 carbon atoms, or E is $-O-T-(OH)_b$, T is a straight or branched chain alkylene of 1 to 18 carbon atoms, cycloalkylene of 5 to 18 carbon atoms, cycloalkenylene of 5 to 18 carbon atoms, a straight or branched chain alkylene of 1 to 4 carbon atoms substituted by phenyl or by phenyl substituted by one or two alkyl groups of 1 to 4 carbon atoms;

b is 1, 2 or 3 with the proviso that b cannot exceed the number of carbon atoms in T, and when b is 2 or 3, each hydroxyl group is attached to a different carbon atoms of T;

R is hydrogen or methyl, m is 1 to 4, when m is 1, $R_2$ is hydrogen, $C_1$–$C_{18}$alkyl or said alkyl optionally interrupted by one or more oxygen atoms, $C_2$–$C_{12}$alkenyl, $C_6$–$C_{10}$aryl, $C_7$–$C_{18}$aralkyl, glycidyl, a monovalent acyl radical of an aliphatic, cycloaliphatic or aromatic carboxylic acid, or a carbamic acid, for example an acyl radical of an aliphatic carboxylic acid having 2–18 C atoms, of a cycloaliphatic carboxylic acid having 5–12 C atoms or of an aromatic carboxylic acid having 7–15 C atoms, or

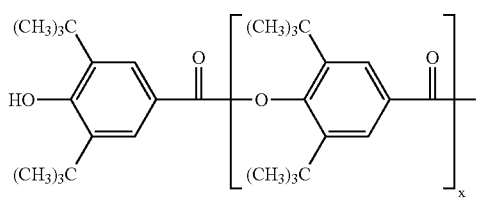

wherein x is 0 or 1,

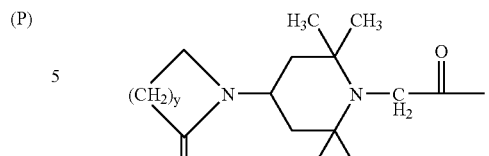

wherein y is 2–4;

when m is 2, $R_2$ is $C_1$–$C_{12}$alkylene, $C_4$–$C_{12}$alkenylene, xylylene, a divalent acyl radical of an aliphatic, cycloaliphatic, araliphatic or aromatic dicarboxylic acid or of a dicarbamic acid, for example an acyl radical of an aliphatic dicarboxylic acid having 2–18 C atoms, of a cycloaliphatic or aromatic dicarboxylic acid having 8–14 C atoms, or of an aliphatic, cycloaliphatic or aromatic dicarbamic acid having 8–14 C atoms;

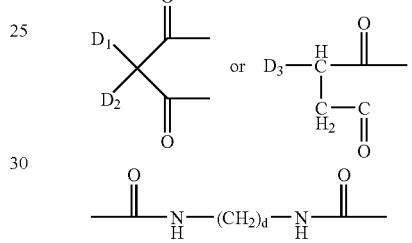

wherein $D_1$ and $D_2$ are independently hydrogen, an alkyl radical containing up to 8 carbon atoms, an aryl or aralkyl radical including 3,5-di-t-butyl-4-hydroxybenzyl radical, $D_3$ is hydrogen, or an alkyl or alkenyl radical containing up to 18 carbon atoms, and d is 0–20;

when m is 3, $R_2$ is a trivalent acyl radical of an aliphatic, unsaturated aliphatic, cycloaliphatic, or aromatic tricarboxylic acid;

when m is 4, $R_2$ is a tetravalent acyl radical of a saturated or unsaturated aliphatic or aromatic tetracarboxylic acid including 1,2,3,4-butanetetracarboxylic acid, 1,2,3,4-but-2-ene-tetracarboxylic, and 1,2,3,5- and 1,2,4,5-pentanetetracarboxylic acid;

p is 1, 2 or 3, $R_3$ is hydrogen, $C_1$–$C_{12}$alkyl, $C_5$–$C_7$cycloalkyl, $C_7$–$C_9$aralkyl, $C_2$–$C_{18}$alkanoyl, $C_3$–$C_5$alkenoyl or benzoyl;

when p is 1, $R_4$ is hydrogen, $C_1$–$C_{18}$alkyl, $C_5$–$C_7$cycloalkyl, $C_2$–$C_8$alkenyl, unsubstituted or substituted by a cyano, carbonyl or carbamide group, aryl, aralkyl, or it is glycidyl, a group of the formula $-CH_2-CH(OH)-Z$ or of the formula $-CO-Z$ or $-CONH-Z$ wherein Z is hydrogen, methyl or phenyl; or a group of the formulae

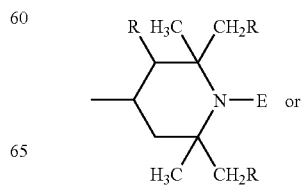

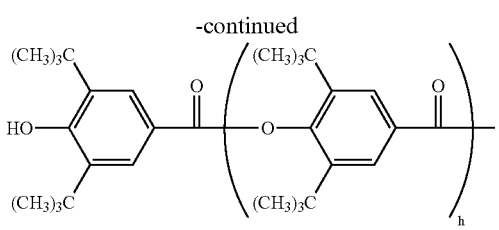

where h is 0 or 1, $R_3$ and $R_4$ together, when p is 1, can be alkylene of 4 to 6 carbon atoms or 2-oxo-polyalkylene the cyclic acyl radical of an aliphatic or aromatic 1,2- or 1,3-dicarboxylic acid, when p is 2, $R_4$ is a direct bond or is $C_1$–$C_{12}$alkylene, $C_6$–$C_{12}$arylene, xylylene, a —CH$_2$CH(OH)—CH$_2$ group or a group —CH$_2$—CH(OH)—CH$_2$—O—X—O—CH$_2$—CH(OH)—CH$_2$— wherein X is $C_2$–$C_{10}$alkylene, $C_6$–$C_{15}$arylene or $C_6$–$C_{12}$cycloalkylene; or, provided that $R_3$ is not alkanoyl, alkenoyl or benzoyl, $R_4$ can also be a divalent acyl radical of an aliphatic, cycloaliphatic or aromatic dicarboxylic acid or dicarbamic acid, or can be the group —CO—; or $R_4$ is

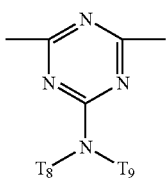

where $T_8$ and $T_9$ are independently hydrogen, alkyl of 1 to 18 carbon atoms, or $T_8$ and $T_9$ together are alkylene of 4 to 6 carbon atoms or 3-oxapentamethylene, for instance $T_8$ and $T_9$ together are 3-oxapentamethylene;

when p is 3, $R_4$ is 2,4,6-triazinyl, n is 1 or 2, when n is 1, $R_5$ and $R'_5$ are independently $C_1$–$C_{12}$alkyl, $C_2$–$C_{12}$alkenyl, $C_7$–$C_{12}$aralkyl, or $R_5$ is also hydrogen, or $R_5$ and $R'_5$ together are $C_2$–$C_8$alkylene or hydroxyalkylene or $C_4$–$C_{22}$acyloxyalkylene;

when n is 2, $R_5$ and $R'_5$ together are (—CH$_2$)$_2$C(CH$_2$—)$_2$;

$R_6$ is hydrogen, $C_1$–$C_{12}$alkyl, allyl, benzyl, glycidyl or $C_2$–$C_6$alkoxyalkyl;

when n is 1, $R_7$ is hydrogen, $C_1$–$C_{12}$alkyl, $C_3$–$C_5$alkenyl, $C_7$–$C_9$aralkyl, $C_5$–$C_7$cycloalkyl, $C_2$–$C_4$hydroxyalkyl, $C_2$–$C_6$alkoxyalkyl, $C_6$–$C_{10}$aryl, glycidyl, a group of the formula —(CH$_2$)$_t$—COO—Q or of the formula —(CH$_2$)$_t$—O—CO—Q wherein t is 1 or 2, and Q is $C_1$–$C_4$alkyl or phenyl; or when n is 2, $R_7$ is $C_2$–$C_{12}$alkylene, $C_6$–$C_{12}$arylene, a group —CH$_2$CH(OH)—CH$_2$—O—X—O—CH$_2$—CH(OH)—CH$_2$— wherein X is $C_2$–$C_{10}$alkylene, $C_6$–$C_{15}$arylene or $C_6$–$C_{12}$cycloalkylene, or a group —CH$_2$CH(OZ')CH$_2$—(OCH$_2$—CH(OZ')CH$_2$)$_2$— wherein Z' is hydrogen, $C_1$–$C_{18}$alkyl, allyl, benzyl, $C_2$–$C_{12}$alkanoyl or benzoyl;

$Q_1$ is —N($R_8$)— or —O—; $E_7$ is $C_1$–$C_3$alkylene, the group —CH$_2$—CH($R_9$)—O— wherein $R_9$ is hydrogen, methyl or phenyl, the group —(CH$_2$)$_3$—NH— or a direct bond;

$R_{10}$ is hydrogen or $C_1$–$C_{18}$alkyl, $R_8$ is hydrogen, $C_1$–$C_{18}$alkyl, $C_5$–$C_7$cycloalkyl, $C_7$–$C_{12}$aralkyl, cyanoethyl, $C_6$–$C_{10}$aryl, the group —CH$_2$—CH($R_9$)—OH wherein $R_9$ has the meaning defined above; a group of the formula

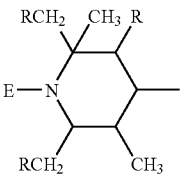

or a group of the formula

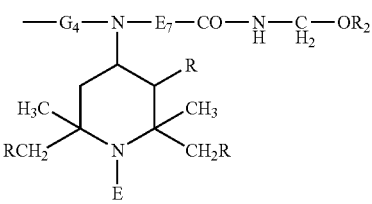

wherein $G_4$ is $C_2$–$C_6$alkylene or $C_6$–$C_{12}$arylene; or $R_8$ is a group —$E_7$—CO—NH—CH$_2$—OR$_{10}$;

Formula F denotes a recurring structural unit of a polymer where $T_3$ is ethylene or 1,2-propylene, is the repeating structural unit derived from an alpha-olefin copolymer with an alkyl acrylate or methacrylate; for example a copolymer of ethylene and ethyl acrylate, and where k is 2 to 100;

$T_4$ has the same meaning as $R_4$ when p is 1 or 2, $T_5$ is methyl, $T_6$ is methyl or ethyl, or $T_5$ and $T_6$ together are tetramethylene or pentamethylene, for instance $T_5$ and $T_6$ are each methyl, M and Y are independently methylene or carbonyl, and $T_4$ is ethylene where n is 2;

$T_7$ is the same as $R_7$, and $T_7$ is for example octamethylene where n is 2, $T_{10}$ and $T_{11}$ are independently alkylene of 2 to 12 carbon atoms, or $T_{11}$ is

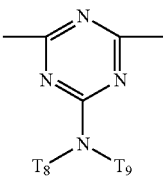

$T_{12}$ is piperazinyl,

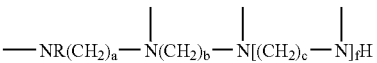

where $R_{11}$ is the same as $R_3$ or is also

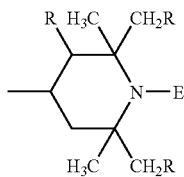

a, b and c are independently 2 or 3, and f is 0 or 1, for instance a and c are each 3, b is 2 and f is 1; and e is 2, 3 or 4, for example 4;

$T_{13}$ is the same as $R_2$ with the proviso that $T_{13}$ cannot be hydrogen when n is 1;

$E_1$ and $E_2$, being different, each are —CO— or —N($E_5$)— where $E_5$ is hydrogen, $C_1$–$C_{12}$ alkyl or $C_4$–$C_{22}$ alkoxycarbonylalkyl, for instance $E_1$ is —CO— and $E_2$ is —N($E_5$)—, $E_3$ is hydrogen, alkyl of 1 to 30 carbon atoms, phenyl, naphthyl, said phenyl or said naphthyl substituted by chlorine or by alkyl of 1 to 4 carbon atoms, or phenylalkyl of 7 to 12 carbon atoms, or said phenylalkyl substituted by alkyl of 1 to 4 carbon atoms, $E_4$ is hydrogen, alkyl of 1 to 30 carbon atoms, phenyl, naphthyl or phenylalkyl of 7 to 12 carbon atoms, or $E_3$ and $E_4$ together are polymethylene of 4 to 17 carbon atoms, or said polymethylene substituted by up to four alkyl groups of 1 to 4 carbon atoms, for example methyl, $E_6$ is an aliphatic or aromatic tetravalent radical, $R_2$ of formula (N) is a previously defined when m is 1;

$G_1$ a direct bond, $C_1$–$C_{12}$ alkylene, phenylene or —NH—G'—NH wherein G' is $C_1$–$C_{12}$alkylene; or wherein the hindered amine compound is a compound of the formula I, II, III, IV, V, VI, VII, VIII, IX, X or XI

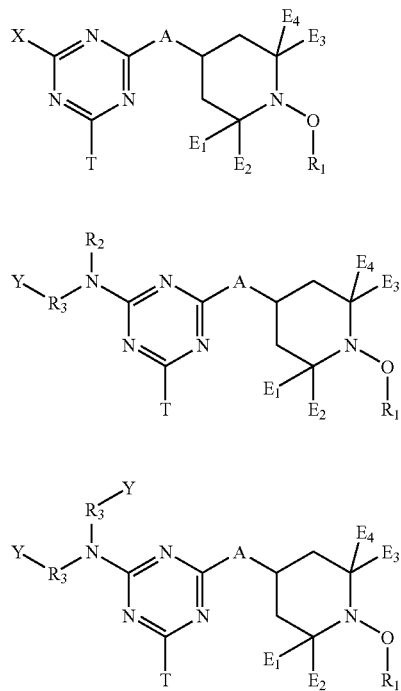

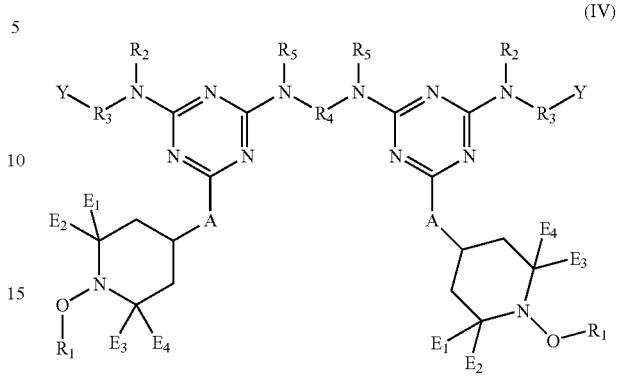

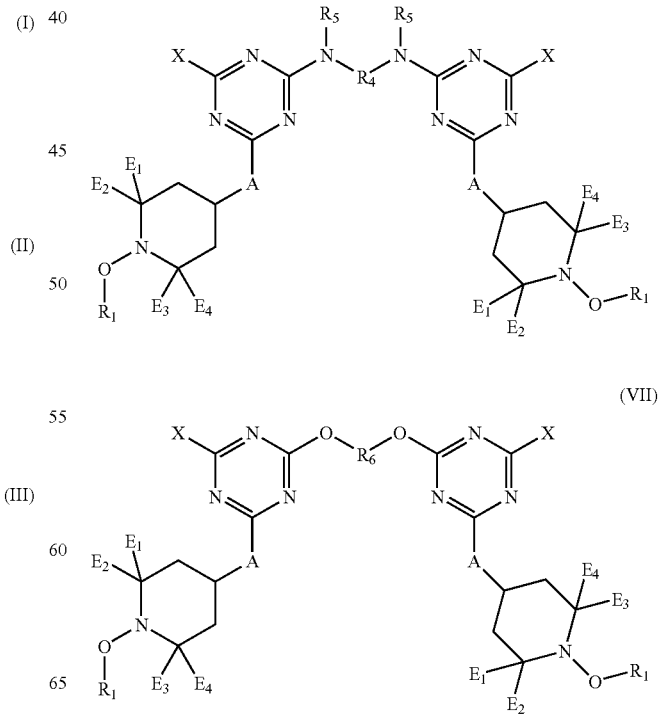

-continued

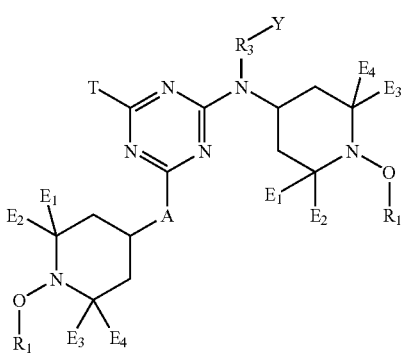
(VIII)

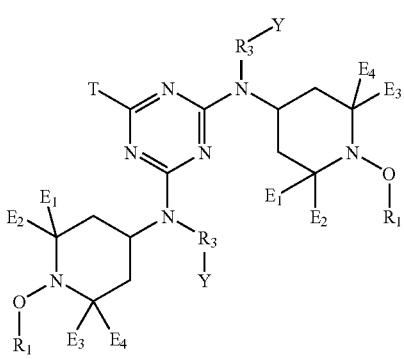
(IX)

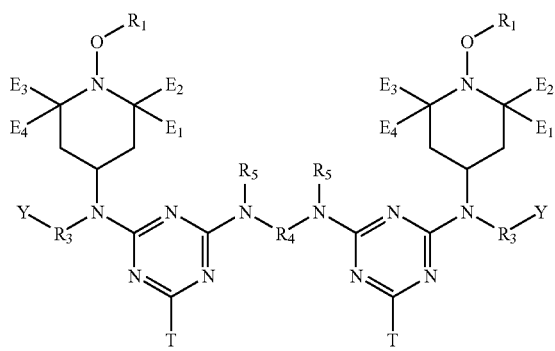
(X)

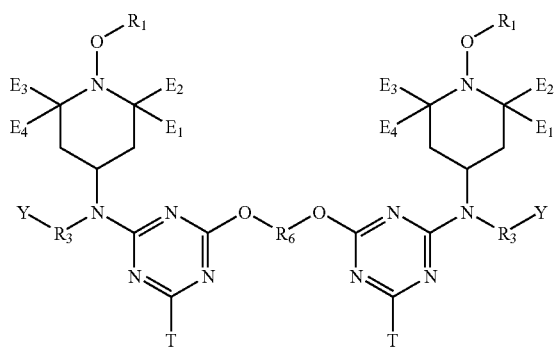
(XI)

wherein $E_1$, $E_2$, $E_3$ and $E_4$ are independently alkyl of 1 to 4 carbon atoms, or $E_1$ and $E_2$ are independently alkyl of 1 to 4 carbon atoms and $E_3$ and $E_4$ taken together are pentamethylene, or $E_1$ and $E_2$; and $E_3$ and $E_4$ each taken together are pentamethylene, $R_1$ is alkyl of 1 to 18 carbon atoms, cycloalkyl of 5 to 12 carbon atoms, a bicyclic or tricyclic hydrocarbon radical of 7 to 12 carbon atoms, phenylalkyl of 7 to 15 carbon atoms, aryl of 6 to 10 carbon atoms or said aryl substituted by one to three alkyl of 1 to 8 carbon atoms, $R_2$ is hydrogen or a linear or branched chain alkyl of 1 to 12 carbon atoms, $R_3$ is alkylene of 1 to 8 carbon atoms, or $R_3$ is —CO—, —CO—$R_4$—, —CONR$_2$—, or —CO—NR$_2$—$R_4$—, $R_4$ is alkylene of 1 to 8 carbon atoms, $R_5$ is hydrogen, a linear or branched chain alkyl of 1 to 12 carbon atoms, or

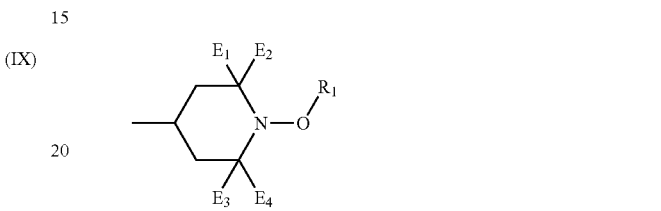

or when $R_4$ is ethylene, two $R_5$ methyl substituents can be linked by a direct bond so that the triazine bridging group —N($R_5$)—$R_4$—N($R_5$)— is a piperazin-1,4-diyl moiety, $R_6$ is alkylene of 2 to 8 carbon atoms or $R_6$ is

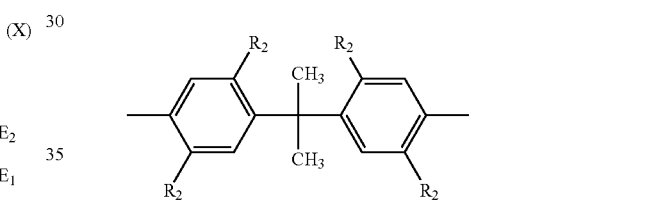

with the proviso that Y is not —OH when $R_6$ is the structure depicted above,

A is —O— or —NR$_7$— where $R_7$ is hydrogen, a straight or branched chain alkyl of 1 to 12 carbon atoms, or $R_7$ is

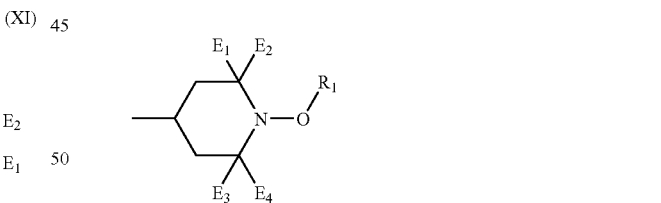

T is phenoxy, phenoxy substituted by one or two alkyl groups of 1 to 4 carbon atoms, alkoxy of 1 to 8 carbon atoms or —N($R_2$)$_2$ with the stipulation that $R_2$ is not hydrogen, or T is

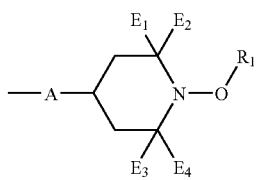

X is —NH$_2$, —NCO, —OH, —O-glycidyl, or —NHNH$_2$, and

Y is —OH, —NH$_2$, —NHR$_2$ where R$_2$ is not hydrogen; or Y is —NCO, —COOH, oxiranyl, —O—glycidyl, or —Si (OR$_2$)$_3$; or the combination R$_3$—Y— is —CH$_2$CH(OH)R$_2$ where R$_2$ is alkyl or said alkyl interrupted by one to four oxygen atoms, or R$_3$—Y— is —CH$_2$OR$_2$;

or wherein the hindered amine compound is a mixture of N,N',N'''-tris{2,4-bis[(1-hydrocarbyloxy-2,2,6,6-tetramethylpiperidin-4-yl)alkylamino]-s-triazin-6-yl}-3,3'-ethylenediiminodipropylaminea; N,N',N'''-tris{2,4-bis[(1-hydrocarbyloxy-2,2,6,6-tetramethylpiperidin-4-yl)alkylamino]-s-triazin-6-yl}-3,3'-ethylenediiminodipropylamine, and bridged derivatives as described by formulas I, II, IIA and III R$_1$NH—CH$_2$CH$_2$CH$_2$NR$_2$CH$_2$CH$_2$NR$_3$CH$_2$CH$_2$CH$_2$NHR$_4$     (I)

T—E$_1$—T$_1$     (II)

T—E$_1$     (IIA)

G—E$_1$—G$_1$—E$_1$—G$_2$     (III)

where in the tetraamine of formula I

R$_1$ and R$_2$ are the s-triazine moiety E; and one of R$_3$ and R$_4$ is the s-triazine moiety E with the other of R$_3$ or R$_4$ being hydrogen, E is

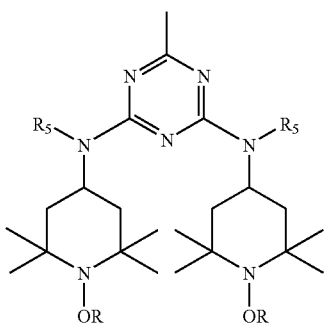

R is methyl, propyl, cyclohexyl or octyl, for instance cyclohexyl,

R$_5$ is alkyl of 1 to 12 carbon atoms, for example n-butyl, where in the compound of formula II or IIA when R is propyl, cyclohexyl or octyl, T and T$_1$ are each a tetraamine substituted by R$_1$–R$_4$ as is defined for formula I, where (1) one of the s-triazine moieties E in each tetraamine is replaced by the group E$_1$ which forms a bridge between two tetraamines T and T$_1$, E$_1$ is

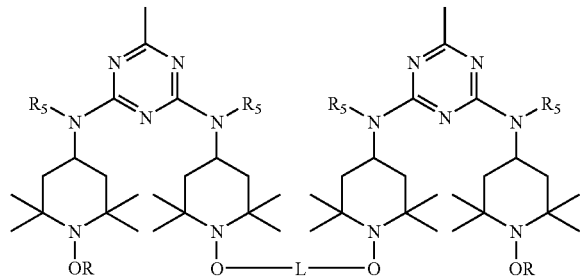

or (2) the group E$_1$ can have both termini in the same tetraamine T as in formula IIA where two of the E moieties of the tetraamine are replaced by one E$_1$ group, or (3) all three s-triazine substituents of tetraamine T can be E$_1$ such that one E$_1$ links T and T$_1$ and a second E$_1$ has both termini in tetraamine T, L is propanediyl, cyclohexanediyl or octanediyl;

where in the compound of formula III

G, G$_1$ and G$_2$ are each tetraamines substituted by R$_1$–R$_4$ as defined for formula I, except that G and G$_2$ each have one of the s-triazine moieties E replaced by E$_1$, and G$_1$ has two of the triazine moieties E replaced by E$_1$, so that there is a bridge between G and G$_1$ and a second bridge between G$_1$ and G$_2$;

which mixture is prepared by reacting two to four equivalents of 2,4-bis[(1-hydrocarbyloxy-2,2,6,6-tetramethylpiperidin-4-yl)butylamino]-6-chloro-s-triazine with one equivalent of N,N'-bis(3-aminopropyl)ethylenediamine;

or the hindered amine is a compound of the formula IIIb

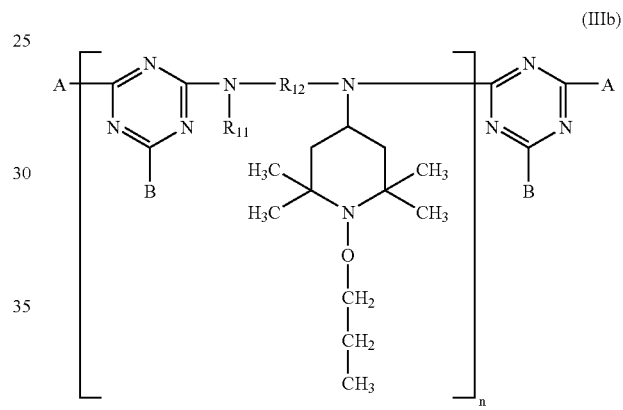

in which the index n ranges from 1 to 15;

R$_{12}$ is C$_2$–C$_{12}$alkylene, C$_4$–C$_{12}$alkenylene, C$_5$–C$_7$cycloalkylene, C$_5$–C$_7$cycloalkylenedi (C$_1$–C$_4$alkylene), C$_1$–C$_4$alkylenedi(C$_5$–C$_7$cycloalkylene), phenylenedi(C$_1$–C$_4$alkylene) or C$_4$–C$_{12}$alkylene interrupted by 1,4-piperazinediyl, —O— or >N—X$_1$ with X$_1$ being C$_1$–C$_{12}$acyl or (C$_1$–C$_{12}$alkoxy)carbonyl or having one of the definitions of R$_{14}$ given below except hydrogen; or R$_{12}$ is a group of the formula (Ib') or (Ic');

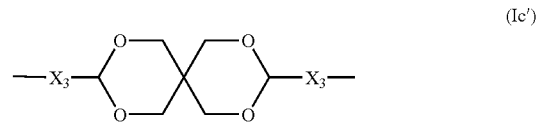

X$_2$ being C$_1$–C$_{18}$alkyl, C$_5$–C$_{12}$cycloalkyl which is unsubstituted or substituted by 1, 2 or 3 C$_1$–C$_4$alkyl; phenyl which is unsubstituted or substituted by 1, 2 or 3 C$_1$–C$_4$alkyl or $C_1$–$C_4$alkoxy; $C_7$–$C_9$phenylalkyl which is unsubstituted or substituted on the phenyl by 1, 2 or 3 $C_1$–$C_4$alkyl; and the radicals $X_3$ being independently of one another $C_2$–$C_{12}$alkylene;

$R_{13}$, $R_{14}$ and $R_{15}$, which are identical or different, are hydrogen, $C_1$–$C_{18}$alkyl, $C_5$–$C_{12}$cycloalkyl which is unsubstituted or substituted by 1, 2 or 3 $C_1$–$C_4$alkyl; $C_3$–$C_{18}$alkenyl, phenyl which is unsubstituted or substituted by 1, 2 or 3 $C_1$–$C_4$alkyl or $C_1$–$C_4$alkoxy; $C_7$–$C_9$phenylalkyl which is unsubstituted or substituted on the phenyl by 1, 2 or 3 $C_1$–$C_4$alkyl; tetrahydrofurfuryl or $C_2$–$C_4$alkyl which is substituted in the 2, 3 or 4 position by —OH, $C_1$–$C_8$alkoxy, di($C_1$–$C_4$alkyl)amino or a group of the formula (Ie');

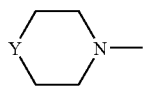

(Ie')

with Y being —O—, —$CH_2$—, —$CH_2CH_2$— or >N—$CH_3$, or —N($R_{14}$)($R_{15}$) is additionally a group of the formula (Ie');

the radicals A are independently of one another —$OR_{13}$, —N($R_{14}$)($R_{15}$) or a group of the formula (IIId);

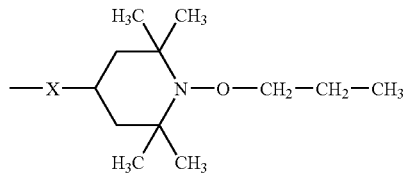

(IIId)

X is —O— or >N—$R_{16}$;

$R_{16}$ is hydrogen, $C_1$–$C_{18}$alkyl, $C_3$–$C_{18}$alkenyl, $C_5$–$C_{12}$cycloalkyl which is unsubstituted or substituted by 1, 2 or 3 $C_1$–$C_4$alkyl; $C_7$–$C_9$phenylalkyl which is unsubstituted or substituted on the phenyl by 1, 2 or 3 $C_1$–$C_4$alkyl; tetrahydrofurfuryl, a group of the formula (IIIf),

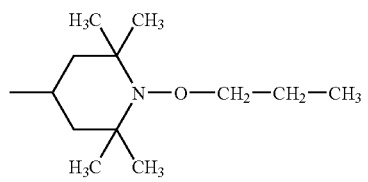

(IIIf)

or $C_2$–$C_4$alkyl which is substituted in the 2, 3 or 4 position by —OH, $C_1$–$C_8$alkoxy, di($C_1$–$C_4$alkyl)amino or a group of the formula (Ie');

$R_{11}$ has one of the definitions given for $R_{16}$; and the radicals B have independently of one another one of the definitions given for A.

Alkyl is straight or branched and is for example methyl, ethyl, n-propyl, n-butyl, sec-butyl, tert-butyl, n-hexyl, n-octyl, 2-ethylhexyl, n-nonyl, n-decyl, n-undecyl, n-dodecyl, n-tridecyl, n-tetradecyl, n-hexadecyl or n-octadecyl.

Cycloalkyl groups include cyclopentyl and cyclohexyl; typical cycloalkenyl groups include cyclohexenyl; while typical aralkyl groups include benzyl, alpha-methyl-benzyl, alpha,alpha-dimethylbenzyl or phenethyl.

Alkoxy and cycloalkoxy comprise the corresponding alkyl and cycloalkyl groups.

If $R_2$ is a monovalent acyl radical of a carboxylic acid, it is for example an acyl radical of acetic acid, stearic acid, salicyclic acid, benzoic acid or β-(3,5-di-tert-butyl-4-hydroxyphenyl) propionic acid.

If $R_2$ is a divalent acyl radical of a dicarboxylic acid, it is for example an acyl radical of oxalic acid, adipic acid, succinic acid, suberic acid, sebacic acid, phthalic acid dibutylmalonic acid, dibenzylmalonic acid or butyl-(3,5-di-tert-butyl-4-hydropxybenzyl)-malonic acid, or bicycloheptenedicarboxylic acid, with succinates, sebacates, phthalates and isophthalates being specific examples.

If $R_2$ is a divalent acyl radical of a dicarbamic acid, it is for example an acyl radical of hexamethylenedicarbamic acid or of 2,4-toluylenedicarbamic acid.

The hindered alkoxyamine stabilizers of components (i) are well known in the art, also known as N-alkoxy hindered amines and NOR hindered amines or NOR hindered amine light stabilizers or NOR HALS.

They are disclosed for example in U.S. Pat. Nos. 5,004,770, 5,204,473, 5,096,950, 5,300,544, 5,112,890, 5,124,378, 5,145,893, 5,216,156, 5,844,026, 6,117,995, 6,271,377, and U.S. application Ser. No. 09/505,529, filed Feb. 17, 2000, Ser. No. 09/794,710, filed Feb. 27, 2001, Ser. No. 09/714,717, filed Nov. 16, 2000, Ser. No. 09/502,239, filed Nov. 3, 1999 and Ser. No. 60/312,517, filed Aug. 15, 2001. The relevant disclosures of these patents and applications are hereby incorporated by reference.

U.S. Pat. No. 6,271,377, and U.S. application Ser. No. 09/505,529, filed Feb. 17, 2000, and Ser. No. 09/794,710, filed Feb. 27, 2001, cited above disclose hindered hydroxyalkoxyamine stabilizers. For the purposes of this invention, the hindered hydoxyalkoxyamine stabilizers are considered a subset of the hindered alkoxyamine stabilizers and are part of present component (i). Hindered hydroxyalkoxyamine stabilizers are also known as N-hydroxyalkoxy hindered amines, or NORol HALS.

Suitable hindered amines of component (i) include for example:

NOR1  1-cyclohexyloxy-2,2,6,6-tetramethyl-4-octadecylaminopiperidine;

NOR2  bis(1-octyloxy-2,2,6,6-tetramethylpiperidin-4-yl) sebacate;

NOR3  2,4-bis[(1-cyclohexyloxy-2,2,6,6-tetramethylpiperidin-4-yl)butylamino]-6-(2-hydroxyethylamino-s-triazine;

NOR4  2,4-bis[(1-cyclohexyloxy-2,2,6,6-tetramethylpiperidin-4-yl)butylamino]-6-chloro-s-triazine;

NOR5  1-(2-hydroxy-2-methylpropoxy)-4-hydroxy-2,2,6,6-tetramethylpiperidine;

NOR6  1-(2-hydroxy-2-methylpropoxy)-4-oxo-2,2,6,6-tetramethylpiperidine;

NOR7  1-(2-hydroxy-2-methylpropoxy)-4-octadecanoyloxy-2,2,6,6-tetramethylpiperidine;

NOR8  bis(1-(2-hydroxy-2-methylpropoxy)-2,2,6,6-tetramethylpiperidin-4-yl)sebacate;

NOR9  bis(1-(2-hydroxy-2-methylpropoxy)-2,2,6,6-tetramethylpiperidin-4-yl)adipate;

NOR10  2,4-bis{N-[1-(2-hydroxy-2-methylpropoxy)-2,2,6,6-tetramethylpiperidin-4-yl]-N-butylamino}-6-(2-hydroxyethylamino)-s-triazine;

NOR11 the reaction product of 2,4-bis[(1-cyclohexyloxy-2,2,6,6-tetramethylpiperidin-4-yl)butylamino]-6- chloro-s-triazine with N,N'-bis(3-aminopropyl)ethylenediamine) [CAS Reg. No. 191680-81-6];
NOR12 the compound of formula

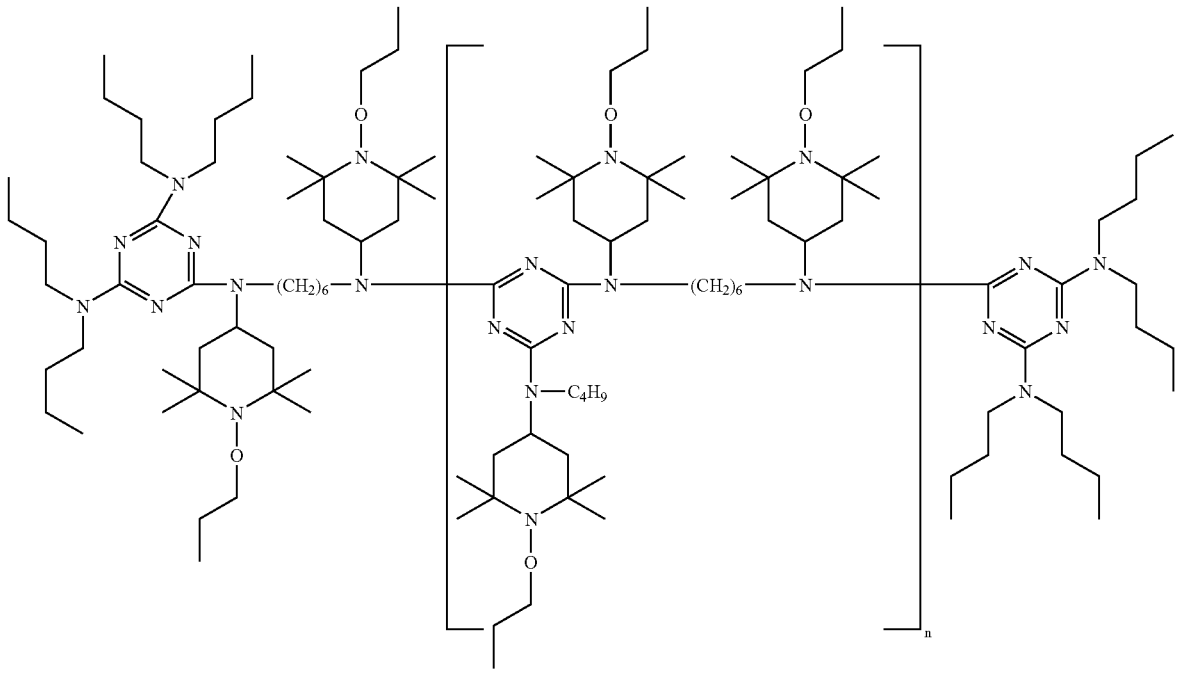

in which n is from 1 to 15; and
NOR13 bis(1-cyclohexyloxy-2,2,6,6-tetramethylpiperidin-4-yl)adipate;

Compound NOR12 is disclosed in example 2 of U.S. Pat. No. 6,117,995.

For example, the present hindered alkoxyamines are hindered cyclohexyloxyamines.

The N-cyclohexyloxy hindered amines are for example selected from the group consisting of
(a) the mixture of compounds of formula I, II, IIA and III where R is cyclohexyl;
(b) 1-cyclohexyloxy-2,2,6,6-tetramethyl-4-octadecylaminopiperidine;
(c) 2,4-bis[(1-cyclohexyloxy-2,2,6,6-tetramethylpiperidin-4-yl)butylamino]-6-(2-hydroxyethylamino-s-triazine;
(d) bis(1-cyclohexyloxy-2,2,6,6-tetramethylpiperidin-4-yl)adipate;
(e) the oligomeric compound which is the condensation product of 4,4'-hexamethylene-bis(amino-2,2,6,6-tetramethylpiperidine) and 2,4-dichloro-6-[(1-cyclohexyloxy-2,2,6,6-tetramethylpiperidin-4-yl)butylamino]-s-triazine end-capped with 2-chloro-4,6-bis(dibutylamino)-s-triazine; and
(f) 2,4-bis[(1-cyclohexyloxy-2,2,6,6-tetramethylpiperidin-4-yl)butylamino]-6-chloro-s-triazine.

Organohalogen Flame Retardants
Oganohalogen flame retardants are for example:
Chloroalkyl phosphate esters (ANTIBLAZE® AB-100, Albright & Wilson; FYROL® FR-2, Akzo Nobel),
tris(2-chloroethyl)phosphate
polybrominated diphenyl oxide (DE-60F, Great Lakes Corp.),
decabromodiphenyl oxide (DBDPO; SAYTEX® 102E),
tris[3-bromo-2,2-bis(bromomethyl)propyl]phosphate (PB 370®, FMC Corp.),
tris(2,3-dibromopropyl)phosphate
tris(2,3-dichloropropyl)phosphate,
chlorendic acid,
tetrachlorophthalic acid,
tetrabromophthalic acid,
bis-(N,N'-hydroxyethyl)tetrachlorphenylene diamine,
poly-β-chloroethyl triphosponate mixture
bis(2,3-dibromopropyl ether) of tetrabromobisphenol A (PE68),
brominated epoxy resin,
ethylene-bis(tetrabromophthalimide) (SAYTEX® BT-93),
bis(hexachlorocyclopentadieno)cyclooctane (DECLORANE PLUS®),
chlorinated paraffins,
octabromodiphenyl ether,
hexachlorocyclopentadiene derivatives,
1,2-bis(tribromophenoxy)ethane (FF680),
tetrabromo-bisphenol A (SAYTEX® RB100),
ethylene bis-(dibromo-norbornanedicarboximide) (SAYTEX® BN451),
bis-(hexachlorocyclopentadieno) cyclooctane,
PTFE
tris-(2,3-dibromopropyl)-isocyanurate, and
ethylene-bis-tetrabromophthalimide.

For example, the convention flame retardant is an organobromine flame retardant.

For example, the conventional flame retardant is a brominated hydrocarbyl phosphate or phosphonate, for example tris[3-bromo-2,2-bis(bromomethyl)propyl]phosphate (PB 370®).

The halogenated flame retardants useful in the present invention may be selected from organic aromatic halogenated compounds such as halogenated benzenes, biphenyls, phenols, ethers or esters thereof, bisphenols, diphenyloxides, aromatic carboxylic acids or polyacids, anhydrides, amides or imides thereof; organic cycloaliphatic or polycycloaliphatic halogenated compounds; and organic aliphatic halogenated compounds such as halogenated paraffins, oligo- or polymers, alkylphosphates or alkylisocyanurates. These components are largely known in the art, see e.g. U.S. Pat. No. 4,579,906 (e.g. col. 3, lines 30–41), U.S. Pat. No. 5,393,812; see also Plastics Additives Handbook, Ed. by H. Zweifel, $5^{th}$ Ed., Hanser Publ., Munich 2001, pp. 681–698.

Thermoplastic Resin

The thermoplastic resion of component (a) is any of a wide variety of polymeric types including polyolefins, polystyrenics, and PVC. For example, the thermoplastic resin may be selected from the group of resins consisting of the polyolefins, the thermoplastic olefins, styrenic polymers and copolymers, ABS and polymers which contain hetero atoms, double bonds or aromatic rings. Specific embodiments are where component (a) is polypropylene, polyethylene, thermoplastic olefin (TPO), ABS or polystyrene.

For example, the thermoplastic resin is selected from the group of resins consisting of the polyolefins, the thermoplastic olefins, styrenic polymers and copolymers, and ABS.

Another embodiment of the present invention is where the thermoplastic resin is selected from the group consisting of polypropylene, polyethylene, thermoplastic olefin (TPO), ABS and polystyrene.

For instance, the thermoplastic resin is polypropylene, polyethylene or thermoplastic olefin (TPO). Organic polymers of component (a) are for example thermoplastic polymers such as polyolefins like polyethylene, polypropylene or copolymers thereof. The thermoplastic polymer is for example polypropylene.

For example, the thermoplastic resins of component (a) are:

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (UL DPE).

Polyolefins, i.e. the polymers of monoolefins exemplified in the preceding paragraph, for example polyethylene and polypropylene, can be prepared by different, and especially by the following, methods:

a) radical polymerization (normally under high pressure and at elevated temperature).

b) catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerization medium. The catalysts can be used by themselves in the polymerization or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

Homopolymers and copolymers from 1.)–4.) may have any stereostructure including syndiotactic, isotactic, hemi-isotactic or atactic; for example atactic polymers. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; for example atactic polymers. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; for example atactic polymers. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and polyester carbonates.

20. Polyketones.

21. Polysulfones, polyether sulfones and polyether ketones.

22. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

The thermoplastic resin of component (a) is for example polypropylene homopolymer. In particular, the resin of the present wire insulation, plugs and sockets consist essentially of polypropylene homopolymer. The term "plug" of course refers to the plastic housing part of the plug assembly. The present plastic electrical parts are for example useful for holiday lighting.

For the compositions of this invention, the level of the additive combination of component (b) is at about 5% to about 20% by weight based on the weight of component (a). For example, component (b) is present from about 8% to about 17% or about 11% to about 14% by weight, based on the weight of component (a). For example, component (b) is present from about 5% to about 17%, from about 5% to about 14%, from about 5% to about 11% or from about 5% to about 8% by weight based on the weigh of component (a).

For instance, component (b) is present from about 8% to about 20%, from about 11% to about 20%, from about 14% to about 20% or from about 17% to about 20% by weight based on the weight of component (a).

For polypropylene based resins of the invention, the level of the additive combination of component (b) is optimal at about 10% to about 20% by weight based on the weight of component (a). For example, component (b) is present from about 12% to about 18% or from about 14% to about 16% by weight based on component (a). For example, component (b) is present from about 12% to about 20%, from about 14% to about 20%, from about 16% to about 20% or from about 18% to about 20% by weight based on component (a). For instance, component (b) is present from about 10% to about 18%, from about 10% to about 16%, from about 10% to about 14% or from about 10% to about 12%, by weight based on component (a).

For polyethylene based resins of the invention, the level of the additive combination of component (b) is optimal at about 5% to about 15% by weight based on the weight of component (a), for example about 7% to about 13% or about 8% to about 11% by weight based on the weight of component (a). For example, component (b) is present from about 5% to about 12%, from about 5% to about 9% or from about 5% to about 8% by weight based on the weight of component (a). For instance, component (b) is present from about 8% to about 15%, from about 11% to about 15% or from about 13% to about 15% by weight based on the weight of component (a).

The ratio (parts by weight) of component (i) to component (ii) is for example between about 1:5 to about 1:200, for instance about 1:15 to about 1:100, for instance from about 1:25 to about 1:70, or about 1:30 to about 1:50. For instance, the ratio of component (i) to component (ii) is about 1:40 by weight. For example the ratio of component (i) to component (ii) is from about 1:15 to about 1:200, from about 1:25 to about 1:200, from about 1:30 to about 1:200 or from about 1:40 to about 1:200. For example, the weight ratio of component (i) to component (ii) is from about 1:5 to about 1:100, from about 1:5 to about 1:70, from about 1:5 to about 1:50, or from about 1:5 to about 1:40.

The present compositions meet flame retardant specifications while containing only minor amounts of antimony compounds such as $Sb_2O_3$, e.g. less than about 1%, for instance less than about 0.1% by weight of component (a); for example, the present compositions are essentially free of antimony. However, in certain formulations, antimony compounds may be advantageous for meeting flame retardant specifications.

Flame-retardant fillers are not required in order to improve the flame retardant properties and achieve a high rating, e.g. in the UL 1694, UL 94 and NFPA 701 tests. Consequently, the compositions of the present invention may contain only minor amounts of flame-retardant fillers, e.g. less than about 3%, for instance less than about 1%, for example less than about 0.1% by weight component (a); for example, the present compositions are essentially free of flame-retardant fillers.

Flame-retardant fillers are known in the art and are selected from the group consisting of magnesium hydroxide, alumina trihydrate and zinc borate. Flame-retardant fillers are inorganic compounds employed for flame-retardant properties, and at high enough levels to be considered "filler".

If conventional fillers such as talc, calcium carbonate and the like are normally employed for instance for flow properties in order to reduce the spread of flaming droplets (not flame-retardant per se), such conventional fillers may also be reduced with the use of the present compositions. For instance, the present compositions may contain only minor amounts of conventional fillers, for example less than about 3%, for instance less than 1%, for example less than about 0.1% by weight of component (a); for example, the present compositions are essentially free of conventional fillers.

Further, the present invention allows for conventional fillers to take the place of more expensive flame-retardant fillers.

The resulting stabilized compositions of the invention may optionally also contain various conventional additives, for example in amounts from about 0.01 to about 10%, for instance from about 0.025 to about 4%, for example from about 0.1 to about 2% by weight of component (a), such as the materials listed below, or mixtures thereof.

1. Antioxidants
1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.
1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.
1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.
1.4. Tocopherols, for example α-tocopherol, β-tocopherol, γ-tocopherol, δ-tocopherol and mixtures thereof (Vitamin E).
1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.
1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5- tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propan, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxy-phenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.17. Amides of β-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl) trimethylenediamide, N,N'-bis(3,5-di-tert-butyl-4-hydroxyphenylpropionyl)-hydrazide, N,N'-bis[2-(3-[3,5-di-tert-butyl-4-hydroxyphenyl]propionyloxy)ethyl] oxamide (Naugard® XL-1 supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyidiphenylamine, 4-isopropoxy-diphenylamine, N-phenyl-1-naphthylamine, N-(4-tert-octylphenyl)-1-naphthylamine, N-phenyl-2-naphthylamine, octylated diphenylamine, for example p,p'-di-tert-octyl-diphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethyl-phenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono-und dialkylated tert-butyldiphenylamines, 2,3-dihydro-3,3-dimethyl-4H-1,4-benzothiazine, phenothiazine, a mixture of mono-und dialkylated tert-butyl/tert-octylphenothiazines, a mixture of mono-und dialkylated tert-octyl-phenothiazines, N-allylphenothiazin, N,N,N',N'-tetraphenyl-1,4-diaminobut-2-ene, N,N-bis(2,2,6,6-tetramethyl-piperid-4-yl-hexamethylenediamine, bis(2,2,6,6-tetramethylpiperid-4-yl)sebacate, 2,2, 6,6-tetramethylpiperidin4-one, 2,2,6,6-tetramethylpiperidin4-ol.

2. UV Absorbers and Light Stabilizers 2.1. 2-(2-Hydroxyphenyl)-2H-benzotriazoles, for example known commercial hydroxyphenyl-2H-benzotriazoles and benzotriazoles as disclosed in, U.S. Pat. Nos. 3,004, 896; 3,055,896; 3,072,585; 3,074,910; 3,189,615; 3,218, 332; 3,230,194; 4,127,586; 4,226,763; 4,275,004; 4,278, 589; 4,315,848; 4,347,180; 4,383,863; 4,675,352; 4,681, 905, 4,853,471; 5,268,450; 5,278,314; 5,280,124; 5,319, 091; 5,410,071; 5,436,349; 5,516,914; 5,554,760; 5,563, 242; 5,574,166; 5,607,987, 5,977,219 and 6,166,218 such as 2-(2-hydroxy-5-methylphenyl)-2H-benzotriazole, 2-(3, 5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3, 5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(ω-hydroxy-octa-(ethyleneoxy)carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3α-cumyl-5-t-octylphenyl)-2H-benzotriazole, 2-(2-hydroxy-3-t-octyl-5α-cumylphenyl)-2H-benzotriazole, 5-fluoro-2-(2-hydroxy-3,5-di-α-cumylphenyl)-2H-benzotriazole, 5-chloro-2-(2-hydroxy-3,5-di-αcumylphenyl)-2H-benzotriazole, 5-chloro-2-(2-hydroxy-3α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3α-cumyl-5-t-octylphenyl)-2H-benzotriazole, 5-trifluoromethyl-2-(2-hydroxy-3α-cumyl-5-t-butylphenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)-phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decan-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecyl-succinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro[4,5]decane und epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. Tris-aryl-o-hydroxyphenyl-s-triazines, for example known commercial tris-aryl-o-hydroxyphenyl-s-triazines and triazines as disclosed in, WO 96/28431 and U.S. Pat. Nos. 3,843,371; 4,619,956; 4,740,542; 5,096,489; 5,106,891; 5,298,067; 5,300,414; 5,354,794; 5,461,151; 5,476,937; 5,489,503; 5,543,518; 5,556,973; 5,597,854; 5,681,955; 5,726,309; 5,736,597; 5,942,626; 5,959,008; 5,998,116; 6,013,704; 6,060,543; 6,187,919; 6,242,598 and 6,255,483, for example 4,6-bis-(2,4-dimethylphenyl)-2-(2-hydroxy-4-octyloxyphenyl)-s-triazine, Cyasorb® 1164, Cytec Corp, 4,6-bis-(2,4-dimethylphenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxyethoxy)phenyl]-6-(4-chlorophenyl)-s-triazine, 2,4-bis[2-hydroxy-4-(2-hydroxy-4-(2-hydroxyethoxy)phenyl]-6-(2,4-dimethylphenyl)-s-triazine, 2,4-bis[2-hydroxy-4-(2-hydroxyethoxy)phenyl]-6-(4-bromophenyl)-s-triazine, 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyloxycarbonylethylideneoxyphenyl)-s-triazine, 2-phenyl-4-[2-hydroxy-4-(3-sec-butyloxy-2-hydroxypropyloxy)phenyl]-6-[2-hydroxy-4-(3sec-amyloxy-2-hydroxypropyloxy)phenyl]-s-triazine, 2,4-bis(2,4-dimethylphenyl)-6-[2-hydroxy-4-(3-benzyloxy-2-hydroxypropyloxy)phenyl]-s-triazine, 2,4-bis(2-hydroxy-4-n-butyloxyphenyl)-6-(2,4-di-n-butyloxyphenyl)-s-triazine, 2,4-bis(2,4-dimethylphenyl)-6-[2-hydroxy-4-(3-nonyloxy*-2-hydroxypropyloxy)-5-α-cumylphenyl]-s-triazine (* denotes a mixture of octyloxy, nonyloxy and decyloxy groups), methylenebis-{2,4-bis(2,4-dimethylphenyl)-6-[2-hydroxy-4-(3-butyloxy-2-hydroxypropoxy)phenyl]-s-triazine}, methylene bridged dimer mixture bridged in the 3:5', 5:5' and 3:3' positions in a 5:4:1 ratio, 2,4,6-tris(2-hydroxy-4-isooctyloxycarbonylisopropylideneoxy-phenyl)-s-triazine, 2,4-bis(2,4-dimethylphenyl)-6-(2-hydroxy-4-hexyloxy-5-α-cumylphenyl)-s-triazine, 2-(2,4,6-trimethylphenyl)-4,6-bis[2-hydroxy-4-(3-butyloxy-2-hydroxypropyloxy)phenyl]-s-triazine, 2,4,6-tris[2-hydroxy-4-(3-sec-butyloxy-2-hydroxypropyloxy)phenyl]-s-triazine, mixture of 4,6-bis-(2,4-dimethylphenyl)-2-(2-hydroxy-4-(3-dodecyloxy-2-hydroxypropoxy)-phenyl)-s-triazine and 4,6-bis-(2,4-dimethylphenyl)-2-(2-hydroxy-4-(3-tridecyloxy-2-hydroxypropoxy)-phenyl)-s-triazine, Tinuvin® 400, Ciba Specialty Chemicals Corp., 4,6-bis-(2,4-dimethylphenyl)-2-(2-hydroxy-4-(3-(2-ethylhexyloxy)-2-hydroxypropoxy)-phenyl)-s-triazine and 4,6-diphenyl-2-(4-hexyloxy-2-hydroxyphenyl)-s-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo [triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

Specific examples are the following phosphites:
Tris(2,4-di-tert-butylphenyl)phosphite (Irgafos® 168, Ciba-Geigy), tris(nonylphenyl)phosphite,

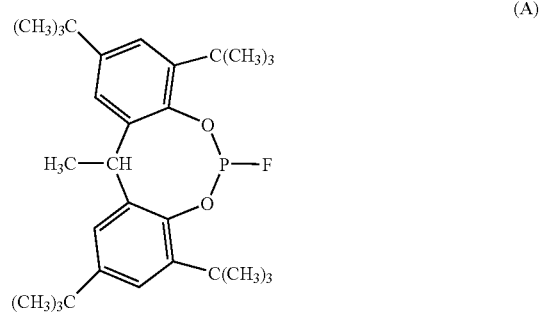

(A)

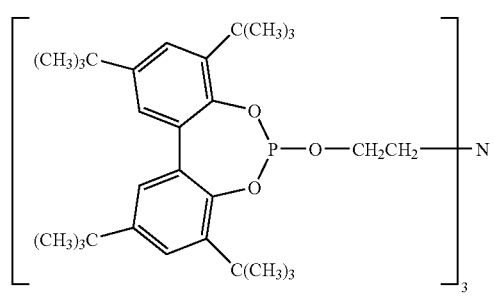

(B)

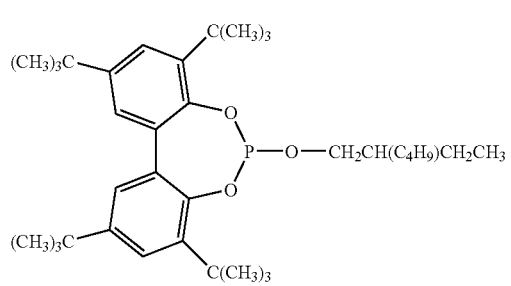

(C)

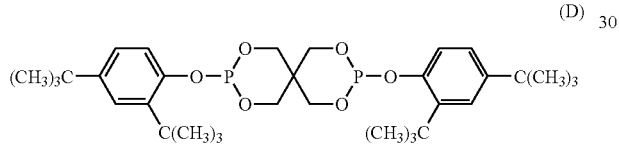

(D)

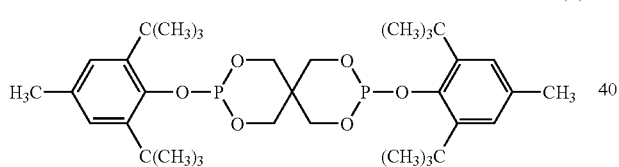

(E)

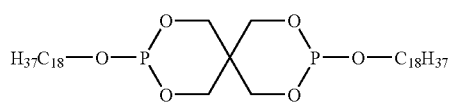

(F)

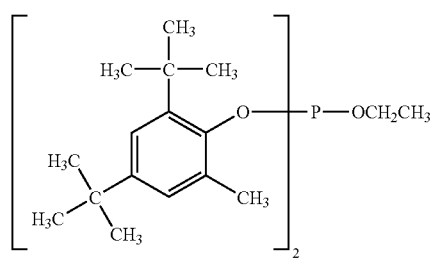

(G)

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilizers, for example, copper salts in combination with iodides and/or phosphorus compounds and salts of divalent manganese.

10. Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or zink pyrocatecholate.

11. Nucleating agents, for example, inorganic substances such as talcum, metal oxides such as titanium dioxide or magnesium oxide, phosphates, carbonates or sulfates of, for example, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers). Specific examples are 1,3:2,4-bis(3',4'-dimethylbenzylidene)sorbitol, 1,3:2,4-di(paramethyldibenzylidene)sorbitol, und 1,3:2,4-di(benzylidene)sorbitol.

12. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example, plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butyl-benzofuran-2-one, 5,7-di-tert-butyl-3-[4-(2-stearoyloxyethoxy)phenyl]benzofuran-2-one, 3,3'-bis[5, 7-di-tert-butyl-3-(4-[2-hydroxyethoxy]phenyl) benzofuran-2-one], 5,7-di-tert-butyl-3-(4-ethoxyphenyl) benzofuran-2-one, 3-(4-acetoxy-3,5-dimethylphenyl)-5, 7-di-tert butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one.

15. Amine oxides, for example amine oxide derivatives as disclosed in U.S. Pat. Nos. 5,844,029 and 5,880,191, didecyl methyl amine oxide, tridecyl amine oxide, tridodecyl amine oxide and trihexadecyl amine oxide. U.S. Pat. Nos. 5,844,029 and 5,880,191 disclose the use of saturated hydrocarbon amine oxides towards the stabilization of thermoplastic resins. It is disclosed that the thermoplastic compositions may further contain a stabilizer or mixture of stabilizers selected from phenolic antioxidants, hindered amine light stabilizers, ultraviolet light absorbers, organic phosphorus compounds, alkaline metal salts of fatty acids and thiosynergists. The co-use of amine oxides with other stabilizers towards stabilizing polyolefins is not exemplified.

Specific examples of additives are phenolic antioxidants (item 1 of the list), further sterically hindered amines (item 2.6 of the list), light stabilizers of the benzotriazole and/or o-hydroxyphenyltriazine class (items 2.1 and 2.8 of the list), phosphites and phosphonites (item 4 of the list) and peroxide-destroying compounds (item 5.) of the list.

Additional specific examples of additives (stabilizers) which are benzofuran-2-ones, such as described, for example, in U.S. Pat. No. 4,325,863, U.S. Pat. No. 4,338,244 or U.S. Pat. No. 5,175,312.

The instant composition can additionally contain another UV absorber selected from the group consisting of the s-triazines, the oxanilides, the hydroxybenzophenones, benzoates and the α-cyanoacrylates. Particularly, the instant composition may additionally contain an effective stabilizing amount of at least one other 2-hydroxyphenyl-2H-benzotriazole; another tris-aryl-s-triazine; or hindered amine or mixtures thereof. For example, additional components are selected from pigments, dyes, plasticizers, antioxidants, thixotropic agents, levelling assistants, basic costabilizers, further light stabilizers like UV absorbers and/or sterically hindered amines, metal passivators, metal oxides, organophosphorus compounds, hydroxylamines, and mixtures thereof, especially pigments, phenolic antioxidants, calcium stearate, zinc stearate, UV absorbers of the 2-(2'-hydroxyphenyl)benzotriazole and 2-(2-hydroxyphenyl)-1,3,5-triazine classes, and sterically hindered amines.

The additives of the invention and optional further components may be added to the polymer material individually or mixed with one another. If desired, the individual components can be mixed with one another before incorporation into the polymer for example by dry blending, compaction or in the melt.

Advantageously, the present compositions may contain an acid scavenger.

Accordingly, further subjects of this invention are flame retardant polymeric electrical part compositions which comprise (a) a thermoplastic resin,
(b) an effective flame retarding amount of a synergistic mixture of
  (i) at least one sterically hindered alkoxyamine stabilizer and
  (ii) at least one conventional organohalogen flame retardant and
(c) an acid scavenger.

Acid scavengers are for example hydrotalcites and amorphous basic aluminum magnesium carbonates, such as those described in U.S. Pat. Nos. 4,427,816, 5,106,898 and 5,234,981, the relevant disclosures of which are hereby incorporated by reference. Hydrotalcite is also known as hycite or DHT4A.

Hydrotalcites are natural or synthetic. The natural hydrotalcite is held to possess a structure $Mg_6Al_2(OH)_{16}CO_3.4H_2O$.

A typical empirical formula of a synthetic hydrotalcite is $Al_2Mg_{4.35}OH_{11.36}CO_{3(1.67)}.xH_2O$.

Examples of the synthetic product include: $Mg_{0.7}Al_{0.3}(OH)_2(CO_3)_{0.15}.0.54H_2O$, $Mg_{4.5}Al_2(OH)_{13}CO_3.3.5H_2O$ and $Mg_{4.2}Al(OH)_{12.4}CO_3$.

The acid scavengers are present in the polymeric compositions at level of about 0.1% to about 1.0% by weight, based on the weight of component (a). For instance, the present acid scavengers are present from about 0.2% to about to about 0.8% or from about 0.4% to about 0.6% by weight, based on the weight of component (a). For example, the present acid scavengers are present from about 0.1% to about 0.8%, from about 0.1% to about 0.6%, from about 0.1% to about 0.4% or from about 0.1% to about 0.2% by weight based on the weight of component (a). For instance, the present acid scavengers are present from about 0.2% to about 1.0%, from about 0.4% to about 1.0%, from about 0.6% to about 1.0% or from about 0.8% to about 1.0% by weight based on the weight of component (a).

The acid scavengers aid the present compositions in color, odor and stability.

The compositions of the present invention may comprise nanoscaled fillers. Nano-scaled fillers are also referred to as "nanoclays" are disclosed for example in U.S. Pat. Nos. 5,853,886 and 6,020,419, the relevant disclosures of which are hereby incorporated by reference.

Nano-scaled fillers of the present invention are for example phyllosilicates or smectite clays, for example organophilic phyllosilicates, naturally occuring phyllosilicates, synthetic phyllosilicates or a mixture of such phyllosilicates. The present nano-scaled fillers are for example montmorillonites, bentonites, beidellites, hectorites, saponites or stevensites.

For example, nano-scaled montmorillonites have a "platey" or platelet structure. The platelets generally have a thickness below about 2 nm. The platelets or particles generally have an average diameter between about 20 and about 30,000 nm, and a ratio of length to width of between about 30,000:1 and 20:1. Commercially available nano-scaled montmorillonites of such structure are Nanomer® I.42E, available from Nanocor, and Cloisite® 30B, available from Southern Clay.

Nano-scaled fillers possess an extremely large surface with high surface energy. The deactivation of the surface energy and the compatibilization of the nano-scaled fillers with a polymer is therefore even more important than with a common micro-scaled filler in order to avoid coagulation and reach an excellent dispersion of the nano-scaled filled in the polymer. The nano-scaled fillers like the phyllosilicates are made organophilic by ion exchange, for example with alkylammonium salts. Such nano-scaled organophilic phyllosilicates are better swellable and easier to disperse in a polymer matrix.

Treated nano-scaled fillers are also referred to as "treated layered clay material" or "organoclay".

The nano-scaled fillers are present in the compositions of the this invention at a concentration of about 0.1% to about 10% by weight, based on the weight of component (a), for example, about 1% to about 9% by weight, for instance about 3% to about 7% by weight, for example about 5% by weight, based on the weight of component (a).

The compositions of this invention may comprise melamine based flame retardants. The melamine based flame retardants are for example:
melamine cyanurate,
melamine borate,
melamine phosphates,
melamine polyphosphates,
melamine pyrophosphates,
melamine ammonium polyphosphate and
melamine ammonium pyrophosphate.

The melamine based flame retardants may be present from about 0.5% to about 15% by weight, from about 1% to about 15%, from about 3% to about 15% or from about 5% to about 15% by weight, based on the weight of component (a). For example, melamine based flame retardants are employed from about 0.5% to about 12%, from about 0.5% to about 10%, from about 0.5% to about 8%, or from about 0.5% to about 6% by weight, based on the weight of component (a).

The present Examples are not to be construed as limiting in any way whatsoever.

The effective flame retarding amount of component (b) is that needed to show flame retarding efficacy as measured by one of the standard methods used to assess flame retardancy. These include tests UL 1694, UL 94 and NFPA 701; UL 1694 Tests for Flammability of Small Polymeric Component Materials, 2002; NFPA 701 Standard Methods of Fire Tests for Flame-Resistant Textiles and Films, 1989 and 1996 and 1999 editions; UL 94 Test for Flammability of Plastic Materials for Parts in Devices and Appliances, 5th Edition, Oct. 29, 1996. Ratings according to the UL 94 V test are as compiled in the following table:

| Rating | Afterflame time | Burning drips | Burn to Clamp |
|--------|-----------------|---------------|----------------|
| V-0    | <10s            | no            | no             |
| V-1    | <30s            | no            | no             |
| V-2    | <30s            | yes           | no             |
| Fail   | <30s            |               | yes            |
| Fail   | >30s            |               | no             |

EXAMPLE 1

Polypropylene Electrical Insulation

Polypropylene homopolymer samples are prepared, comprising 15% by weight of a combination of one of the N-cyclohexyloxy hindered amines (a)–(f) with tris[3-bromo-2,2-bis(bromomethyl)propyl]phosphate, where the weight ratio of each of the N-cyclohexyloxy hindered amines to the conventional organobromo flame retardant is 1:14. Weight percents are based on polymer.

Each formulation meets (passes) UL 1694, Tests for Flammability of Small Polymeric Component Materials, specifications.

EXAMPLE 2

Polyethylene Electrical Parts

Polyethylene electrical parts, HDPE and LDPE, are prepared which comprise 8% by weight of a combination of each of the N-cyclohexyloxy hindered amines (a)–(f) with tris[3-bromo-2,2-bis(bromomethyl)propyl]phosphate, where the weight ratio of each of the N-cyclohexyloxy hindered amines to the conventional organobromo flame retardant is 1:14.

Each formulation meets (passes) NFPA 701 test.

EXAMPLE 3

Polystyrene Electrical Parts

Example 2 is repeated with polystyrene electrical parts. Each formulation passes UL 94 and UL 1694 tests.

EXAMPLE 4

Acid Scavengers

Examples 1–3 are repeated with the further addition of about 0.1% to about 1.0% of a present acid scavenger. Excellent flame retardant results are achieved. The further addition of 0.6% by weight, based on polymer, of a present acid scavenger improves the color, odor and stability of the flame retardant polymers.

EXAMPLE 5

Examples 1–4 are repeated where the alkoxyamine is replaced with at least one of the following alkoxyamines:
1-cyclohexyloxy-2,2,6,6-tetramethyl-4-octadecylaminopiperidine;
bis(1-octyloxy-2,2,6,6-tetramethylpiperidin-4-yl)sebacate;
2,4-bis[(1-cyclohexyloxy-2,2,6,6-tetramethylpiperidin-4-yl)butylamino]-6-(2-hydroxyethylamino-s-triazine;
bis(1-cyclohexyloxy-2,2,6,6-tetramethylpiperidin-4-yl)adipate;
2,4-bis[(1-cyclohexyloxy-2,2,6,6-tetramethylpiperidin-4-yl)butylamino]-6-chloro-s-triazine;
1-(2-hydroxy-2-methylpropoxy)-4-hydroxy-2,2,6,6-tetramethylpiperidine;
1-(2-hydroxy-2-methylpropoxy)-4-oxo-2,2,6,6-tetramethylpiperidine;
1-(2-hydroxy-2-methylpropoxy)-4-octadecanoyloxy-2,2,6,6-tetramethylpiperidine;
bis(1-(2-hydroxy-2-methylpropoxy)-2,2,6,6-tetramethylpiperidin-4-yl)sebacate;
bis(1-(2-hydroxy-2-methylpropoxy)-2,2,6,6-tetramethylpiperidin-4-yl)adipate;
2,4-bis{N-[1-(2-hydroxy-2-methylpropoxy)-2,2,6,6-tetramethylpiperidin-4-yl]-N-butylamino}-6-(2-hydroxyethylamino)-s-triazine;
the reaction product of 2,4-bis[(1-cyclohexyloxy-2,2,6,6-tetramethylpiperidin-4-yl)-butylamino]-6-chloro-s-triazine with N,N'-bis(3-aminopropyl)ethylenediamine) [CAS Reg. No. 191680-81-6]; and the compound of formula

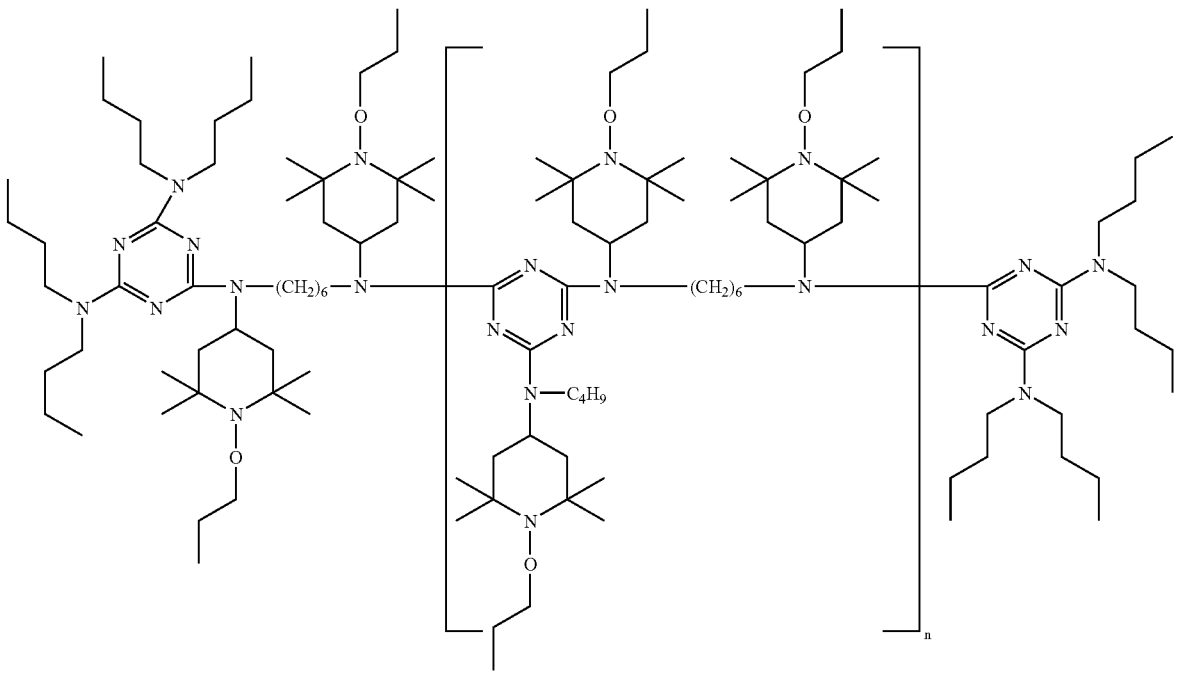

in which n is from 1 to 15, and where the organohalogen flame retardant is replaced with at least one of the following flame retardants:
chloroalkyl phosphate esters,
tris(2-chloroethyl)phosphate,
polybrominated diphenyl oxide,
decabromodiphenyl oxide,
tris[3-bromo-2,2-bis(bromomethyl)propyl]phosphate,
tris(2,3-dibromopropyl)phosphate
tris(2,3-dichloropropyl)phosphate,
chlorendic acid,
tetrachlorophthalic acid,
tetrabromophthalic acid,
bis-(N,N'-hydroxyethyl)tetrachlorphenylene diamine,
poly-βchloroethyl triphosponate mixture,
bis(2,3-dibromopropyl ether) of tetrabromobisphenol A,
brominated epoxy resin,
ethylene-bis(tetrabromophthalimide),
bis(hexachlorocyclopentadieno)cyclooctane,
chlorinated paraffins,
octabromodiphenyl ether,
hexachlorocyclopentadiene derivatives,
1,2-bis(tribromophenoxy)ethane,
tetrabromo-bisphenol A,
ethylene bis-(dibromo-norbornanedicarboximide),
bis-(hexachlorocyclopentadieno) cyclooctane,
PTFE,
tris-(2,3-dibromopropyl)-isocyanurate and
ethylene-bis-tetrabromophthalimide.

Excellent results are achieved towards flame retardancy.

EXAMPLE 6

The previous Examples are repeated, replacing tris[3-bromo-2,2-bis(bromomethyl)propyl]phosphate with bis(2,3-dibromopropyl ether) of tetrabromobisphenol A. The bis (2,3-dibromopropyl ether) of tetrabromobisphenol A is employed for example at a level of from about 9% to about 15% by weight, based on the weight of the thermoplastic resin, for example about 10%, 12% or 14% by weight. The weight ratio of the sterically hindered alkoxyamine to the conventional organobromo flame retardant in this instance is for example from about 1:25 to about 1:70, from about 1:30 to about 1:50, for example about 1:40 or 1:50. Antimony trioxide may be present at a level of about 2% to about 6% by weight, based on the thermoplastic resin. For example, antimony is present at a level of about 3%, 4%, 5% or 6% by weight. Melamine based flame retardants are also advantageous. For example, a present melamine based flame retardant is present from about 5% to about 15% by weight based on the thermoplastic resin, for example about 6%, 7%, 8%, 9% or 10% by weight. The formulations pass UL 1694.

What is claimed is:

1. A flame retardant polyolefin electrical part composition which comprises
    (a) a polyolefin resin and
    (b) an effective flame retarding amount of a synergistic mixture of
        (i) at least one sterically hindered alkoxyamine stabilizer and
        (ii) at least one brominated hydrocarbyl phosphate or phosphonate flame retardant,
    where the weight ratio of component (i) to component (ii) is about 1:14 to about 1:50 and where the mixture of component (b) is present from about 8% to about 17% by weight based on the weight of component (a) and
    where the alkoxyamines of component (i) are of the formula

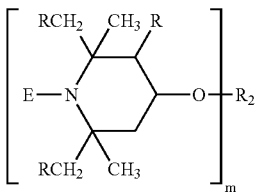

where
E is —O—methyl, —O-propyl or —O-cyclohexyl
m is 1 to 4,
when m is 1,
R$_2$ is hydrogen, C$_1$–C$_{18}$alkyl or said alkyl optionally interrupted by one or more oxygen atoms, C$_2$–C$_{12}$alkenyl, C$_6$–C$_{10}$aryl, C$_7$–C$_{18}$aralkyl, glycidyl, a monovalent acyl radical of an aliphatic, cycloaliphatic or aromatic carboxylic acid, of a carbamic acid, of a cycloaliphatic carboxylic acid having 5–12 C atoms or of an aromatic carboxylic acid having 7–15 C atoms,
when m is 2,
R$_2$ is C$_1$–C$_{12}$alkylene, C$_4$–C$_{12}$alkenylene, xylylene, a divalent acyl radical of an aliphatic, cycloaliphatic, aralkyl or aromatic dicarboxylic acid or of a dicarbamic acid, of a cycloaliphatic or aromatic dicarboxylic acid having 8–14 C atoms, or of an aliphatic, cycloaliphatic or aromatic dicarbamic acid having 8–14 C atoms;
when m is 3,
R$_2$ is a trivalent acyl radical of an aliphatic, unsaturated aliphatic, cycloaliphatic, or aromatic tricarboxylic acid; and
when m is 4,
R$_2$ is a tetravalent acyl radical of a saturated or unsaturated aliphatic or aromatic tetracarboxylic acid,
or
where the alkoxyamines are of the formula
R$_1$NH—CH$_2$CH$_2$CH$_2$NR$_2$CH$_2$CH$_2$NR$_3$CH$_2$CH$_2$CH$_2$NHR$_4$
where
R$_1$ and R$_2$ are the s-triazine moiety E'; and one of R$_3$ and R$_4$ is the s-triazine moiety E' with the other of R$_3$ or R$_4$ being hydrogen,
E' is

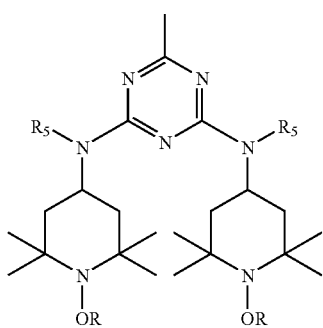

R is methyl, propyl or cyclohexyl,
R$_5$ is alkyl of 1 to 12 carbon atoms,
which compound is prepared by reacting two to four equivalents of 2,4-bis[(1-hydrocarbyloxy-2,2,6,6-tetramethylpiperidin-4-yl)butylamino]-6-chloro-s-triazine with one equivalent of N,N'-bis(3-aminopropyl)ethylenediamine;
or
where the alkoxyamines are of the formula IIIb

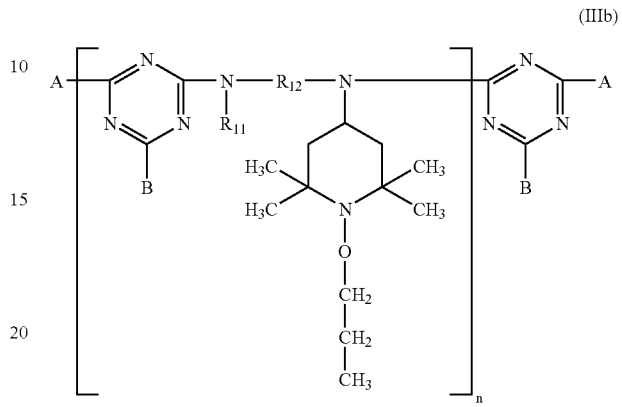

in which the index n ranges from 1 to 15;
R$_{12}$ is C$_2$–C$_{12}$alkylene, C$_4$–C$_{12}$alkenylene, C$_5$–C$_7$cycloalkylene, C$_5$–C$_7$cycloalkylenedi(C$_1$–C$_4$alkylene), C$_1$–C$_4$alkylenedi(C$_5$–C$_7$cycloalkylene), phenylenedi(C$_1$–C$_4$alkylene) or C$_4$–C$_{12}$alkylene interrupted by 1,4-piperazinediyl, —O— or >N—X$_1$ with X$_1$ being C$_1$–C$_{12}$acyl or (C$_1$–C$_{12}$alkoxy)carbonyl or having one of the definitions of R$_{14}$ given below except hydrogen; or R$_{12}$ is a group of the formula (Ib') or (Ic');

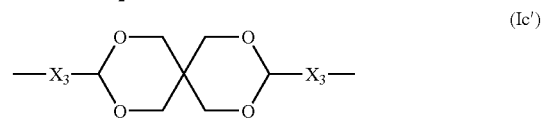

X$_2$ being C$_1$–C$_{18}$alkyl, C$_5$–C$_{12}$cycloalkyl which is unsubstituted or substituted by 1, 2 or 3 C$_1$–C$_4$alkyl; phenyl which is unsubstituted or substituted by 1, 2 or 3 C$_1$–C$_4$alkyl or C$_1$–C$_4$alkoxy; C$_7$–C$_9$phenylalkyl which is unsubstituted or substituted on the phenyl by 1, 2 or 3 C$_1$–C$_4$alkyl; and
the radicals X$_3$ being independently of one another C$_2$–C$_{12}$alkylene;
R$_{13}$, R$_{14}$ and R$_{15}$, which are identical or different, are hydrogen, C$_1$–C$_{18}$alkyl, C$_5$–C$_{12}$cycloalkyl which is unsubstituted or substituted by 1, 2 or 3 C$_1$–C$_4$alkyl; C$_3$–C$_{18}$alkenyl, phenyl which is unsubstituted or substituted by 1, 2 or 3 C$_1$–C$_4$alkyl or C$_1$–C$_4$alkoxy; C$_7$–C$_9$phenylalkyl which is unsubstituted or substituted on the phenyl by 1, 2 or 3 C$_1$–C$_4$alkyl; tetrahydrofurfuryl or C$_2$–C$_4$alkyl which is substituted in the 2, 3 or 4 position by —OH, C$_1$–C$_8$alkoxy, di(C$_1$–C$_4$alkyl)amino or a group of the formula (Ie');

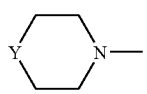
(Ie')

with Y being —O—, —CH₂—, —CH₂CH₂— or >N—CH₃,
or —N(R₁₄)(R₁₅) is additionally a group of the formula (Ie');
the radicals A are independently of one another —OR₁₃, —N(R₁₄)(R₁₅) or a group of the formula (IIId);

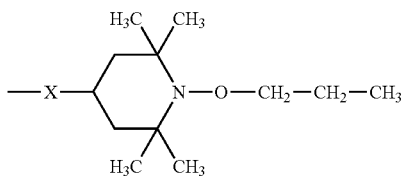
(IIId)

X is —O— or >N—R₁₆;
R₁₆ is hydrogen, C₁–C₁₈alkyl, C₃–C₁₈alkenyl, C₅–C₁₂cycloalkyl which is unsubstituted or substituted by 1, 2 or 3 C₁–C₄alkyl; C₇–C₉phenylalkyl which is unsubstituted or substituted on the phenyl by 1, 2 or 3 C₁–C₄alkyl; tetrahydrofurfuryl, a group of the formula (IIIf),

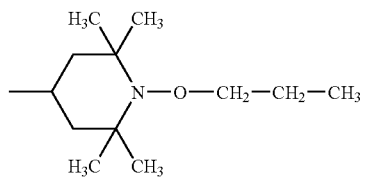
(IIIf)

or C₂–C₄alkyl di(C₁–C₄alkyl)amino or a group of the formula (Ie');

R₁₁ has one of the definitions given for R₁₆; and
the radicals B have independently of one another one of the definitions given for A.

2. A composition according to claim 1 where the alkoxyamines are selected from the group consisting of bis(1-cyclohexyloxy-2,2,6,6-tetramethylpiperidin-4-yl) adipate;
the reaction product of 2,4-bis[(1-cyclohexyloxy-2,2,6,6-tetramethylpiperidin-4-yl)butylamino]-6-chloro-s-triazine with N,N'-bis(3-aminopropyl)ethylenediamine) [CAS Reg. No. 191680-81-6]; and
the compound of formula

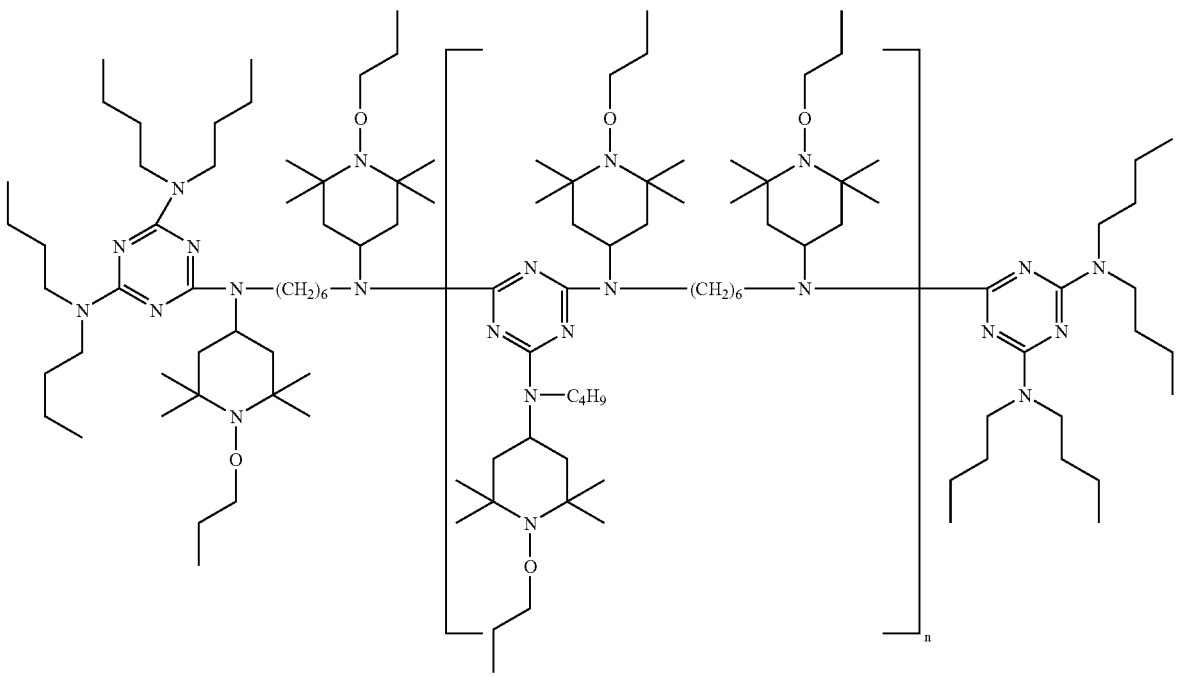

in which n is from 1 to 15.

3. A composition according to claim 1 where E is cyclohexyloxy.

4. A composition according to claim 1 where the brominated hydrocarbyl phosphate or phosphonate flame retardant is tris[3-bromo-2,2-bis(bromomethyl)propyl]phosphate.

5. A composition according to claim 1 where the polyolefin resin is polypropylene, polyethylene or propylene/ethylene copolymer.

6. A composition according to claim 1 where the weight ratio of component (i) to component (ii) is about 1:30 to about 1:50.

7. A composition according to claim 1 further comprising melamine based flame retardants.

8. A composition according to claim 1 containing no filler or a filler in an amount less than about 3% by weight based on the weight of component (a).

9. A composition according to claim 1 which further comprises
(c) an acid scavenger.

10. A composition according to claim 9 where the acid scavenger is selected from the group consisting of natural or synthetic hydrotalcites and amorphous basic aluminum magnesium carbonates.

11. A composition according to claim 9 where the acid scavenger is present from about 0.1% to about 1.0% by weight, based on the weight of component (a).

12. A composition according to claim 9 where the acid scavenger is present from about 0.2% to about 0.8% by weight, based on the weight of component (a).

13. An electrical part composition according to claim 1 which is a plug, socket or wire insulation.

14. An electrical part composition according to claim 9 which is a plug, socket or wire insulation.

* * * * *